Dec. 10, 1968     E. LECLUYSE ET AL     3,415,915
CONTINUOUS METHOD AND MEANS FOR THE MANUFACTURE OF HOLLOW OBJECTS
Filed Sept. 10, 1965     4 Sheets-Sheet 1
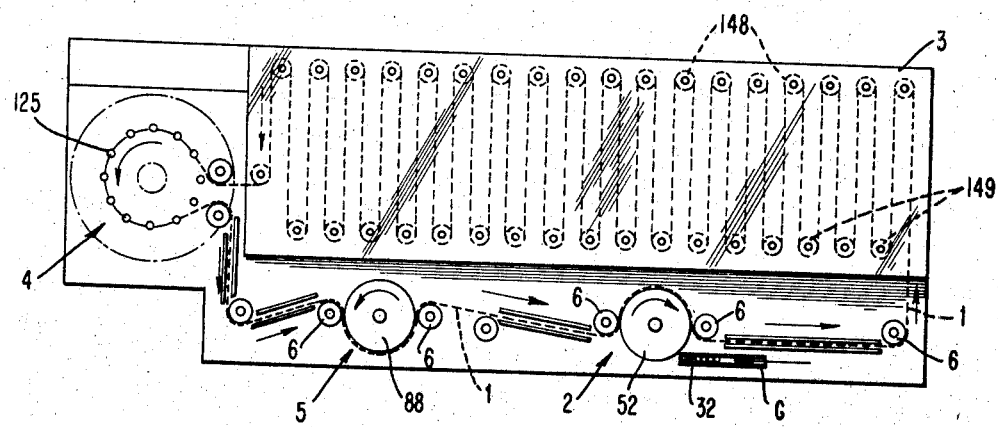
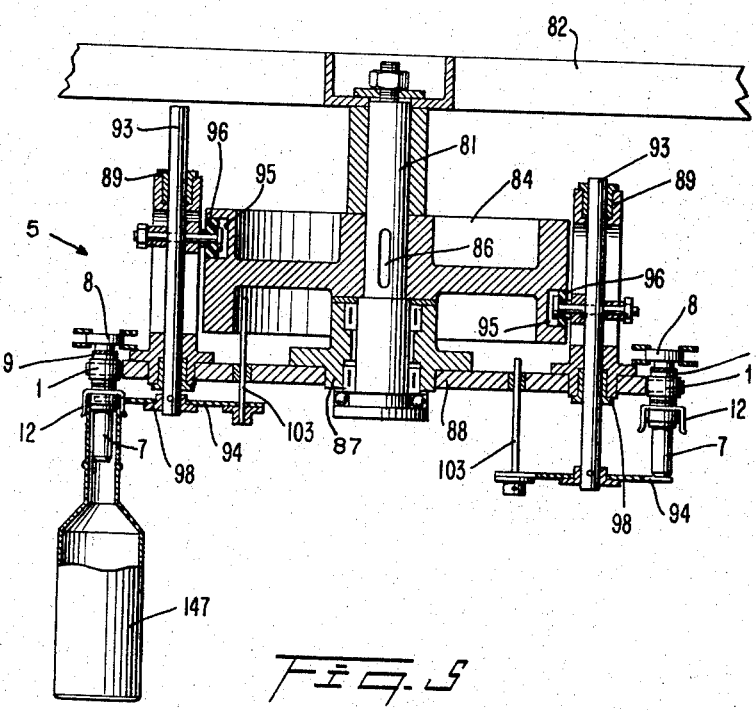
INVENTORS
EDOUARD LECLUYSE
ANTOINE BERANGER
BY
Bauer and Seymour
ATTORNEYS Dec. 10, 1968  E. LECLUYSE ET AL  3,415,915
CONTINUOUS METHOD AND MEANS FOR THE MANUFACTURE OF HOLLOW OBJECTS
Filed Sept. 10, 1965  4 Sheets-Sheet 2
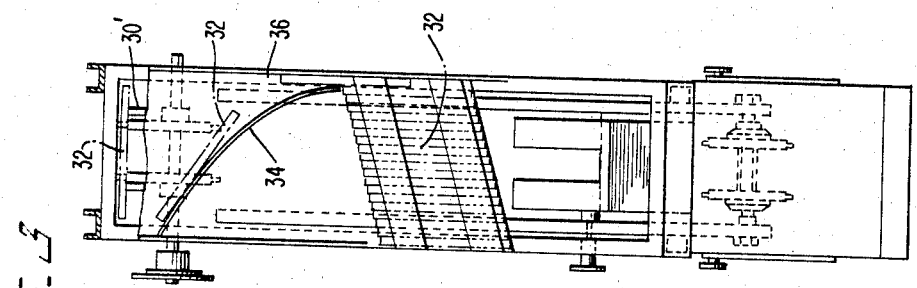
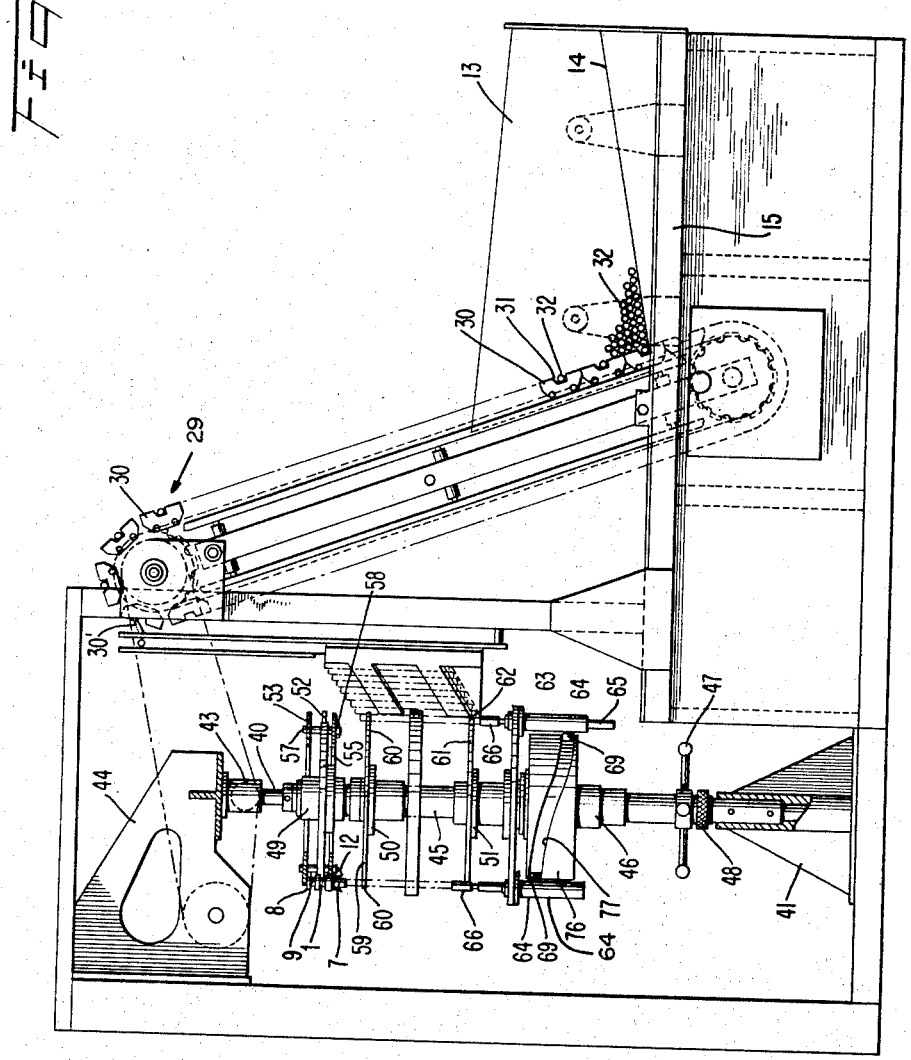
INVENTORS
EDOUARD LECLUYSE
BY  ANTOINE BERANGER
Bauer and Seymour
ATTORNEYS

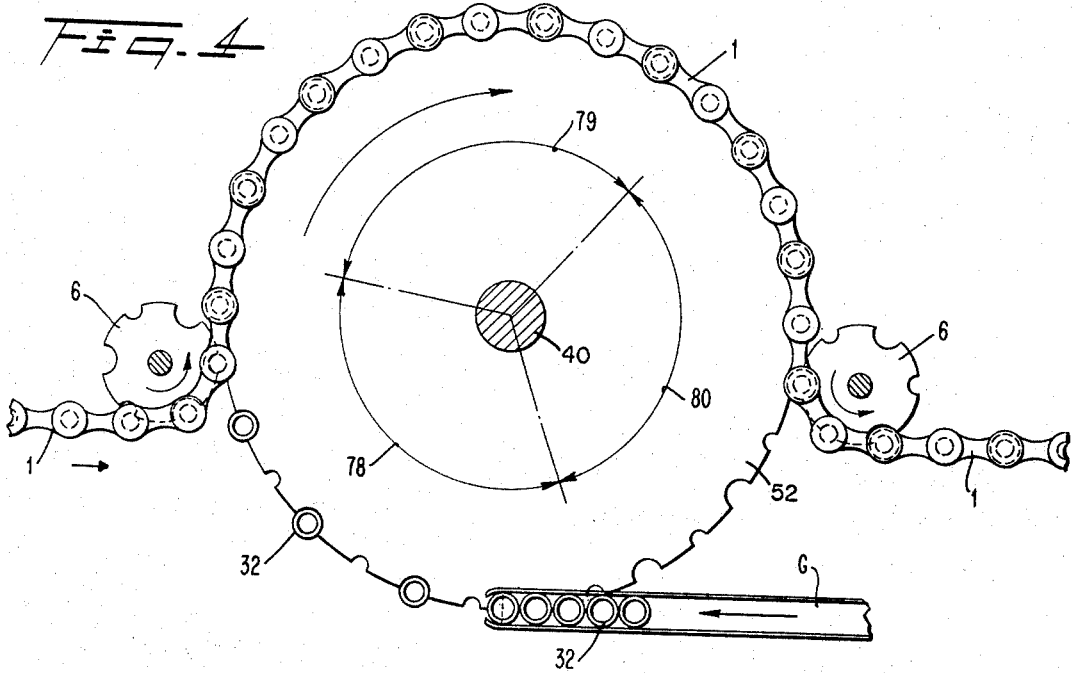
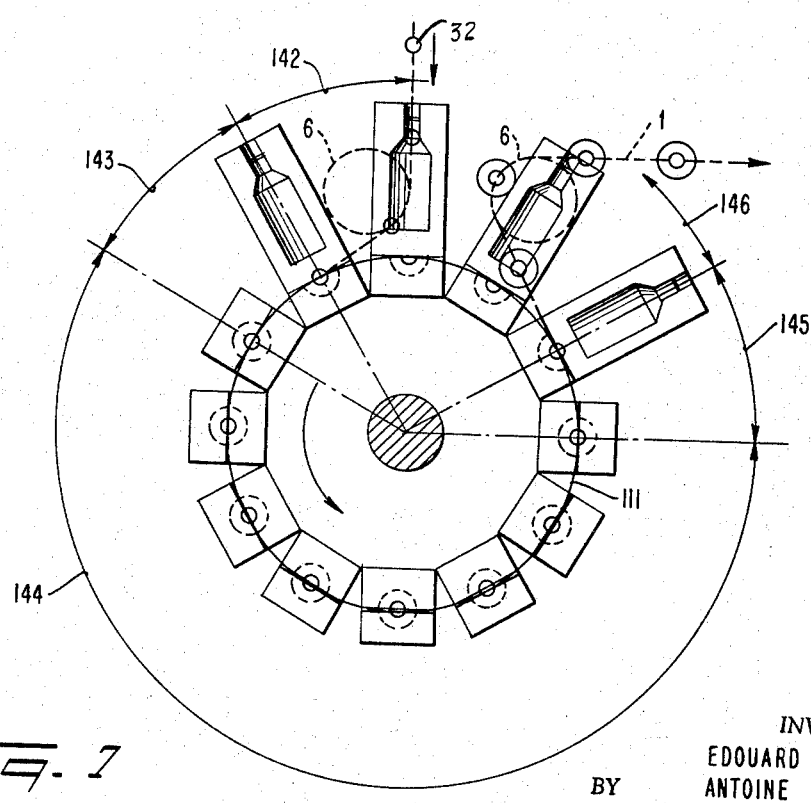

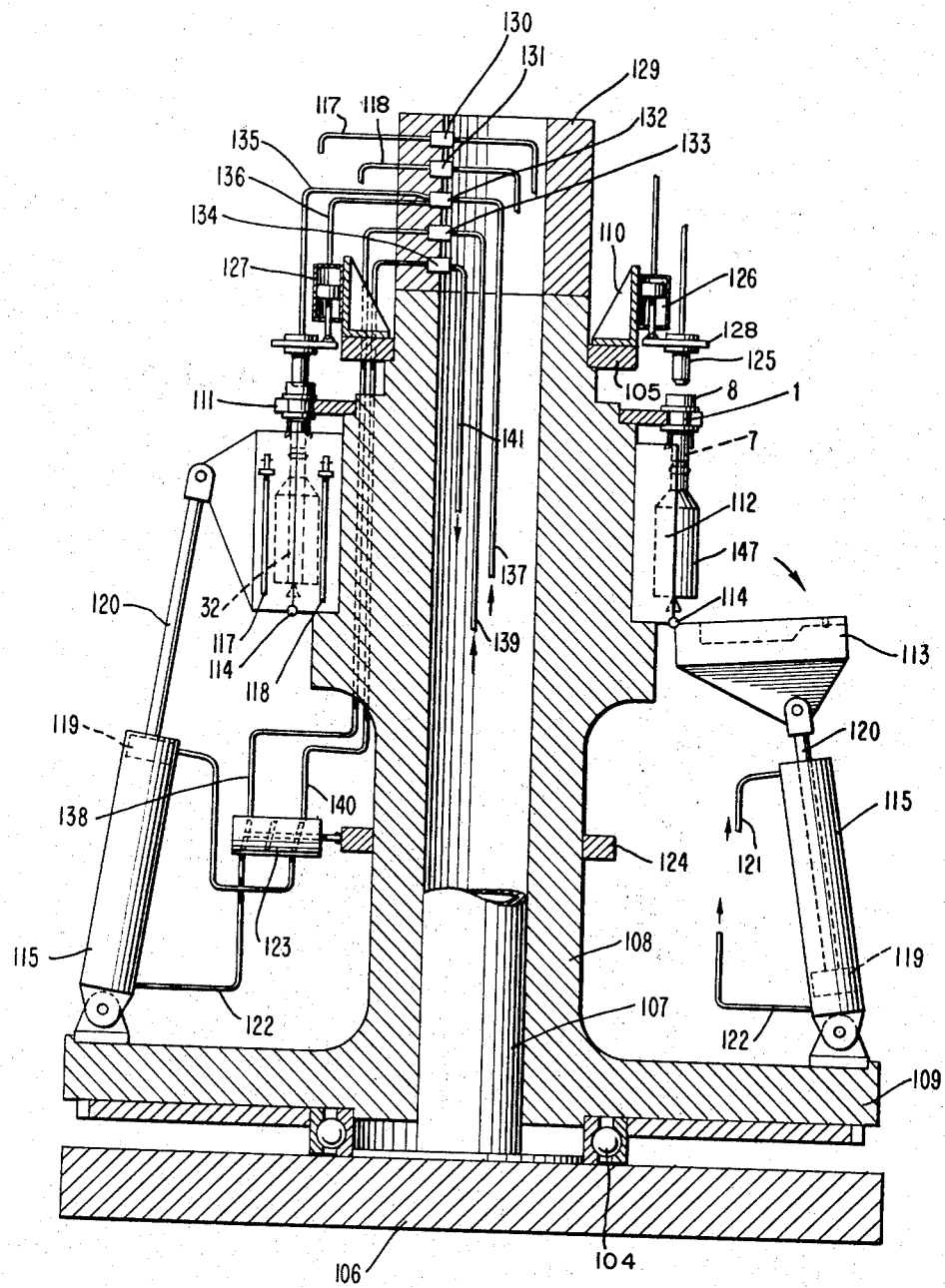

United States Patent Office 3,415,915
Patented Dec. 10, 1968

3,415,915
CONTINUOUS METHOD AND MEANS FOR THE MANUFACTURE OF HOLLOW OBJECTS
Edouard Lecluyse, Dampierre en Crot, Aubigny, Cher, and Antoine Beranger, Charenton, Seine, France, assignors to Tuboplast-France, S.A., Paris, France
Filed Sept. 10, 1965, Ser. No. 486,302
Claims priority, application France, Sept. 10, 1964, 987,706
15 Claims. (Cl. 264—94)

This invention relates to the manufacture of hollow objects by the molding of tubular, thermoplastic preforms by internally applied pneumatic pressure. It relates to a novel method and a novel apparatus which accomplish the operation. The invention also includes novel machines which contribute to the perfection of the invention. The invention is applicable to mineral and organic thermoplasts, for instance glass and resins. It has been proposed to make hollow objects from tubular preforms, for example those obtained by extrusion in the manufacture of which a tube is extruded and immediately molded under internally applied pneumatic pressure to produce a shape corresponding to that of the mold. Such processes have proceeded by interrupted motion. A process is also known wherein tubes are drawn in sequence from a stockpile and put into the molds of the machine which proceeds stepwise through its cycle, stopping to receive the preform, moving to the next station, stopping for the application of pneumatic pressure, and so on until the operation is completed. In each case the tube is brought to a sufficient temperature to permit molding before it is admitted to the mold. Such apparatus gives only moderate yields.

It is an object of this invention to produce a high-speed machine capable of more rapid production of hollow objects from thermoplastic preforms than has heretofore been possible.

The broad objects of the invention are accomplished, generally speaking, by an apparatus which proceeds by continuous motion as distinguished from interrupted motion, picking up preforms in sequence at a loading station, transporting them through a heating station where they are brought to molding temperature, moving them from the heating station to the molding station at which they are blown within molds while still in continuous motion, transporting them from the molding station to a discharge station where they are released from the conveyor which continues on to begin another cycle at the loading station. The apparatus to accomplish this includes the major elements of the conveyor which is kept in continuous motion, an apparatus which loads the conveyor with preforms, an oven wherein the preforms are brought to molding temperature while still on the conveyor, a molding machine synchronized with the conveyor which encloses the preforms, blows them to shape, and releases them as the conveyor progresses, and a discharge station which removes the molded hollow object from the conveyor. Within the major novelty of the system there is much important novelty of apparatus and of detail.

The operation of the apparatus can be followed in general from FIGS. 1 and 5. As shown in these figures a chain conveyor 1 passes around the rotary disk 52 of the loading station 2 where the preform tubes 32 are mounted on the nozzles 7, FIGURE 5, of the support chain. The chain carries the preforms into the furnace 3 where they are heated to softening temperature, for instance 190° F. for certain plastic tubes or 800° C. for certain glass tubes. Leaving the furnace the chain engages the sprocket 111 of the mold station, the preforms are enclosed within the molds, one after the other, blowing nozzles 125 are applied to the nozzles 7 in sequence, each preform is expanded to the size and shape of the mold, the nozzles are withdrawn, the molds are opened, and the chain carries the molded shapes to the discharge station 5. At the discharge station the chain passes around the rotary disk 88, the shaped articles are removed from the nozzles 7 and handled in any ordinary way, for instance by sending them to storage on a conveyor. The chain then passes to loading station 2. The chain moves continuously at uniform speed, driving the loading, molding and discharge apparatus. Power drives for chains are numerous, can be applied anywhere, and are not indicated on the drawing except by letter D. Each station performs its operations automatically and continuously once power is supplied by the chain. The speed of which this apparatus is capable is very great, production being on the order of 5800 bottles per hour or more, it being understood that the speed is variable from low to high without other change than altering the speed of the drive D. The minimum speed will be established by the nature of the material being molded, its thickness, temperature, and heat retentivity, being always sufficient to assure molding temperature and viscosity when the preform reaches the mold. The feeder which supplies the preforms to the loading station is driven from the same drive D in synchronism with the chain so as to furnish a regular supply of preforms.

The loading machine, the molding machine, and the discharge machine are each equipped with a rotary table or disk which carries a plurality of loading, molding, and discharge devices, respectively, synchronized with the conveyor, which accept the preforms in sequence, perform their respective functions thereupon, and return to repeat their cycles with uninterrupted motion.

A preferred form of the apparatus includes an endless chain which is continuously driven through the several stations of the process, which receives the preforms at the loading station, passes them through the heating element, carries them to the molding station where they are blown and, if desired, cooled, and delivers them to the discharge station from whence they are transported elsewhere.

According to a characteristic of the invention the chain conveyor is equipped with preform gripping mechanism which supports and aligns the tubes for proper acceptance by the several machines. The tubular preforms must be open at one end but may be open or closed at the other end. Associated with this chain is a feeding mechanism illustrated in FIGS. 2 and 3 which includes a stock of preforms in horizontal position, means to remove the preforms one by one in synchronism with the chain, means to turn the preforms from horizontal to vertical position, and means to deliver them to the loading machine by which they are mounted on the chain with proper alignment for each subsequent step.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a schematic plan view of the apparatus;

FIG. 2 is a vertical elevational view of the feeding and loading machines;

FIG. 3 is an elevational view of the discharge end of the feeder;

FIG. 4 is a diagrammatic plan view of the rotary table of the loading machine;

FIG. 5 is a vertical section through the discharge machine with some parts omitted for purposes of clarity;

FIG. 6 is a vertical sectional view through the molding machine with some of its parts diagrammatically illustrated; and FIG. 7 is a diagram in plan of the rotary table of the molding machine.

We will now describe each section of the machine.

The feeding section is illustrated in FIGS. 2 and 3. It includes a support 15 upon which is mounted a conveyor generally identified at 29 and comprising a number of hingedly connected elements 30 and a hopper 13 which contains a supply of preforms 32. The bottom 14 of hopper 13 is inclined so that the preforms, tubes of glass or plastic, are urged downwardly by gravity into contact with the conveyor. The conveyor elements 30 have notches 31 each of which picks up one preform and discharges it upon a short ramp 30' from whence it rolls into a chute 36 which has a ramp 34, FIGURE 3, which changes the position of the preform from horizontal to vertical as it falls into the feeder proper 37. The feeder proper has an inclined bottom 38 down which the vertically arranged preforms proceed in line to be picked up, one by one, by the loading machine.

The function of the loader is diagrammatically illustrated in FIG. 4. A vertical cylindrical post 40, FIGURE 2, is mounted fixedly in a base support 41 and at its top end by a socket 43 carried by a bracket 44. On the post 40, is mounted a sleeve 45 which is free to rotate upon a bearing 46 which can be raised and lowered by means of a screw thread control fed by arms 47 and a lock nut 48. The sleeve is so mounted that it can turn about the fixed post 40 on roller bearings not shown, inside of bearing 46, without entraining the bearing in its motion. Sleeve 45 supports three naves 49, 50, 51. Nave 49 carries toothed wheel or rotary disk 52 previously mentioned and which is, in effect a sprocket, upon which the chain 1 is mounted. Wheel 52 supports a buffer plate 53 and a notched disk 55. The three plates are interconnected by bolts 57 and spacers, not shown. On the intermediate nave 50 is mounted a disk 59 having circumferentially-spaced notches 60 in its periphery. On the upper part of nave 51 is mounted a disk 61 having notches 62 of each which is in vertical alignment with a respective one of the notches in disk 55. Below the disk 61 is a plate 63 carrying vertical sleeve guides 64 containing what are in effect piston rods 65 to each of which is attached a respective one of a plurality of cam followers 69 which run in cam 77 in the cam drum 76 and which is fixed on post 40. On the upper ends of rods 65 are elastic buffers 66. Greased guides hold rods 65 in the interior of sleeve guides or cylinders 64. Long slots extend vertically through and along the sides of the cylinders 64 and through which the cam followers project. These details are similar to corresponding details in FIG. 5 which is on a larger scale.

As the chain travels around the idler sprocket 6 onto wheel 52, it rotates the wheel buffer plate 53, notched disk 55, disks 59 and 61, and plate 63 which carries the sleeve guides 64. As the guides rotate past the cam drum 76 the followers 69 follow the cam. As the disks 61, 59 pass the feeder the upper and lower notches thereof capture a preform which rests upon and is supported by the top of pusher or buffer 66 and is held against centrifugal displacement by an external guide G shown in FIG. 4. The circuit is divided into three sectors as identified at 78, 79, 80, FIGURE 4. The first sector 78 is that within which the preforms are received by the pusher 66 and the disks 59, 61. Toward the end of the sector the chain 1 engages the wheel 52. In the sector 79 buffers 66 thrust the tubes upward onto nozzles 7, best seen in FIG. 5. These nozzles are mounted in the chain 1, a head 8 resting upon a spacer 9 which rests upon a ring of chain 1. The nozzle 7 projects through the ring as shown. Mounted on nozzle 7 is a clip 12 having open sides. When the tube is pushed up over the nozzle it is gripped by the clip 12 and is maintained in vertical position throughout the remainder of the process. Each nozzle 7 is of such size that each tube fits thereover with little opportunity for play. The nozzle is tubular, the upper end of the hole, in head 8, being provided with a valve seat (not shown). In the sector 80 pushers 66 are lowered by cam 77 leaving the preforms suspended each by a respective one of clips 12 and laterally supported by the nozzle.

In FIG. 4 the mounting plate has positions for 15 preforms 32, of which only 13 are in use at one time. The chain 1 comes from the left, passes around the first idler sprocket wheel 6, each head 8 comes into vertical alignment with a respective one of preforms 32 in sector 78, and the tubes are pushed up onto the nozzles 7, firmly mounting the tubes on the chain before the pushers are withdrawn. After the chain passes around the second sprocket idler 6 it carries the preforms, firmly mounted, into furnace or oven 3 having a series of sprockets 148, 149, FIGURE 1, around which the chain is entrained. At the end of the oven, which may be heated by any known means, the preforms have been brought to correct molding temperature so that they are capable of being blown internally to the shape of a circumscribed mold, and as they exit from the furnace they move to the molding station 4.

The molding machine includes a fixed base 106, FIGURE 6, upon which is mounted a bearing post 107 which receives the central sleeve 108 of a rotary support 109. Antifriction bearings 104 support the plate 109 above base 106. A series of molds is mounted on and in circumferentially-spaced relation about central sleeve 108. Each mold is comprised of an inner half 112, which is supported fixedly by the post, and a hinged part or half 113 which can pivot about 90° around hinge 114 under the drive of piston rod 120, which is attached to piston 119 in cylinder 115. Compressed gas is admitted to one or the other end of the cylinder through pipe lines 121, 122, to close the mold or to open it. A sprocket 111 is fixedly mounted on the column 108 and receives the chain and its blowing nozzles 7, 8 which support the tube 32 in a plastic condition.

For clarity of explanation all complication has been omitted from FIG. 6 of the drawing so that, in effect, the drawing shows only one of the molds with its controls. It is to be understood that the construction of the other molds will be the same. As shown in FIG. 7 there are 12 molds on central sleeve 108. As the chain moves around the axis of bearing post 107 it rotates the sleeve through sequential segments 142, 143, 144, 145, 146 in each of which a particular series of operations occurs.

We will describe the construction and then describe the operation.

The chain 1 (FIG. 6) moves into engagement with sprocket 111 carrying preforms 32 into the portion 112 of the mold where the preform engages a cylindrical indentation in what may be regarded as the neck piece of the mold. The lower portion of the mold is pivoted upwardly by rod 120, closing the mold, blower nozzle 125 having a valve seat conforming to that of head 8 is now lowered by a piston 126, appropriately operated by compressed gas, and when it is in sealing position compressed gas under pressure flows through it, through nozzle 7, and into the preform, expanding it until it fits the shape of the mold. At its upper part a central sleeve 108 carries a ring 105 on which are mounted brackets 110 which carry the operating apparatus for the blowing nozzles 125. Below this is mounted the sprocket 111 which engages the chain 1.

The halves 112, 113 of the molds are connected to a cooling water system schematically illustrated by conduits 117, 118 which are connected to passages within the solid parts of the mold halves. The supply of fluid under pressure to the cylinders 115 is controlled by a valve 123 and operated from a ring 124 which is mounted on central sleeve 108. The apparatus which raises and lowers the blowing nozzles 125 for the purpose of connecting them in pressure-tight relation with the preforms to expand them inside the molds, includes a supporting ring 128 which moves vertically within guide cylinders 126. At the top of the central sleeve 108 is mounted a distributing ring 129 which includes the distributing heads for the various pipes or conduits. These include heads 130 through 134 and the couplings necessary to distribute fluids, such as air, oil and water, and to permit the return of such liquids after they have performed their function. The heads 130, 131 are for the supply and return of water through conduits 117, 118. The head 132 is connected to a cylinder 127 and to nozzle 125 to deliver compressed air through conduits 135, 136; it is connected to a source of compressed air by a conduit 137. The head 133 for supplying oil is connected at one end to a valve 123 by a conduit 138 and at the other end to a source of oil under pressure by a conduit 139. In the same way the head 134, which is for the return of oil, is connected to valve 123 by conduit 140 and to the oil reservoir by pipe 141. As shown by FIGURE 6, all supply and return pipes 137, 139, 141, etc., extend vertically in and along central sleeve 108.

In FIG. 7 is schematically shown the different sectors which correspond to the different functions of the molding machine. There are twelve molds on the turntable. The chain 1, sprocket 111 and the idlers 6 are shown to indicate their relation with respect to the molds. There is a zone of acceptance 142 where the mold is open and the preform is put into it, a section 143 where the mold is closed upon the plastic preform, a zone of expansion under pressure and of cooling 144, the expansion preceding the cooling, and a zone 145 in which the mold is open and the hollow shape is removed and is carried by the chain to the discharge machine.

The discharge machine is shown in FIG. 5. It comprises a fixed post 81 which is suspended from a support 82. A rotary disk 88 is carried by a nave 87 and suitable bearings on the lower end of the post. A cam drum 84 is fixed to the post by a key 86. Rods 93 are mounted in guides 89, 98 which are in turn mounted in the rotary disk. Each rod 93 has a cam follower 96 mounted thereon which follows the cam groove 95 which is formed in cam drum 84. Mounted on the lower ends of the rods 93 are forked plates 94, the inner ends of which are attached to vertical guide rods 103 which are guided for vertical translation only, by respective bearings in disk 88.

The operation of the unloader is easily followed on FIG. 5.

As chain 1 carrying bottle 147, which has just been removed from the mold, engages the rotary disk 88, the rim of which is provided with appropriate sprockets and notches to fit the chain, the fork of plate 94 passes on opposite sides of the inner finger of the clip 12 in a position above the neck of the bottle. As the disk 88 is rotated by the chain, follower 96 follows the cam groove 95 and lowers the plate 94. The fingers of the fork of the plate remove the neck of the bottle from the nozzle 7 by pressing the neck downward until it falls onto an appropriate conveyor, or is otherwise conveyed to storage or use. As the motion of the rotary disk continues, the cam returns the forked plate to receiving position for another operation.

A more detailed description of the operation of the apparatus is as follows:

The chain 1 entrains the idlers 6 and the rotary platforms and moves continuously through the several stations, the links equipped with supporting nozzles 7 coming successively into contact with the rotary platforms of the loading, blowing and unloading machines, of course passing through the oven. The preforms are fed by gravity into their positions on the loading platform and are thrust upward into gripping relation to the holding means associated with the nozzles. The preforms are maintained in vertical position, and pass through heating zones of the oven, emerging at molding temperature. At the molding station the chain, carrying the preforms in vertical position, at a temperature at which they can be blown, engages the sprocket 111 and the rotary platform which carries the molds. At the moment when the chain comes in contact with the gear in the sector 142 the heated preform is placed in the axis of the mold, the movement of rotation continues, and by means of mechanism 123 the mold is closed in sector 143. At the moment when the mold is closed the blowing nozzle is applied to the upper orifice of the support nozzle and compressed air is blown through them into the preform. It will be of assistance to think of the preform which is being blown in FIG. 6 as initially shaped like a test tube with two open ends. While the preform carrier passes through the sector 144 the blowing takes place. As the blown shape passes from sector 144 to sector 145 the blowing head is removed and the opening of the mold commences, being completed as the chain leaves the gear 111. The chain then passes on to the discharge station. The discharge station receives the chain on the geared teeth of a rotary platform. The blowing nozzle 7 carried by the chain and carrying the blown shape is received within the fork of the discharge mechanism as the chain engages the rotary platform. The fork is above the top of the blown shape. As rotation continues the cam groove 85 imposes upon the cam follower 96 a downward movement which removes the hollow object from the grip of the clips. The blown shape as it leaves the machine can be received upon and carried upright by a conveyor appropriately located below it.

As there are many useful furnaces the details of a heating arrangement and of construction have not been set forth herein. In general however the furnace will be provided with a series of sprocket wheels extending longitudinally on each side of the machine, the chain being passed over them and going back and forth across the furnace as it progresses from one end toward the other. It is useful to provide four zones of temperature control, low at the place of admission of the preforms, progressing stepwise from zone to zone to the discharge end. Because of the lateral movement of the chain it is easy to separate such zones from each other by means of laterally extending baffles. The oven itself will be constructed in accordance with good heat retentive design, fully insulated and with its heating means appropriately located to secure the maximum concentration on the preforms.

An advantage of this invention is its production of hollow shapes at very great speed compared to the speeds of the prior art. This is derived from the construction of the apparatus and from the continuous and rapid motion of the carrier chain. The invention affords rapid and precise handling of tubular objects, maintains them in position, performs operations upon them in succession and co-ordinates the operations of several machines and a heating oven.

As many apparently widely different embodiments of the present invention may be made without departing from the spirit and scope thereof, it is to be understood that the invention is not limited to the specific embodiments.

What is claimed is:

1. A method of continuously forming hollow objects which comprises mounting a series of preforms upon a continuously moving chain conveyor, passing the chain conveyor and the supported preforms through an oven heated to the softening point of the preforms, passing the chain and preforms in synchronism into operative contact with a respective one of a series of molds, introducing each preform thereon, sequentially into a mold, closing the mold over the preform, blowing the preform to the shape of the mold, opening the mold, and removing the molded shape from the moving chain.

2. The method according to claim 1 in which the preform is a thermoplastic resin having a molding temperature circa 150° C. and the oven is heated to about 210° C.

3. The method according to claim 1 in which the preform is glass having a softening point of about 2000 poises and the oven is heated to about 400° C.

4. A method according to claim 1 in which the preforms are tubes.

5. A method according to claim 4 in which the preforms are suspended below the conveyor chain by appendages of the chain.

6. Apparatus for forming hollow objects which comprises a chain conveyor, a charge station, a heating station, a molding station, and a discharge station, means to move the chain conveyor continuously from station to station, preform supporting means continuously carried by said chain conveyor, means at said charging station to mount preforms on the preform supporting means, means at said molding station to mold the hot preforms issuing from the heating station, and means at the discharge station to remove the molded objects from the preform supporting means of said chain.

7. Apparatus according to claim 6 in which the charge station, the molding station and the discharge station include respective rotary platforms each synchronized with movement of said chain upon which are mounted respectively means to mount a preform on each respective one of said preform supporting means of said chain, means to mold the heated preform while carried by and moving with said chain, and means to remove the molded objects from the chain.

8. Apparatus according to claim 7 in which the charge and discharge stations also include fixed circular cams adjacent the rotary platforms, and cam followers comprising the operative agency of the preform mounting and the object removal means.

9. Apparatus for molding thermoplastic articles comprising a single chain conveyor and means to move it in a cycle from charging, to heating, to molding, to discharging, and to charging stations, said chain comprising sprocket links and preform supporting means forming means articulating said links, the preform supporting means comprising guide means adapted to fit within one end of a preform and pressure means adapted to hold the preform on the guide means.

10. Apparatus according to claim 9 in which the guide means is tubular and adapted to cooperate with blowing means at the molding station to transmit gas pressure to the interior of the preform.

11. Apparatus for molding tubular thermoplastic articles by internally applied fluid pressure which comprises a chain, a tubular guide and support continuously carried by the chain, means to slide the neck of a tubular preform over the tubular guide, means to hold the preform on the guide, molding means comprising a plurality of molds coperating with the chain, and means to deliver fluid under pressure through the tubular guide to the interior of the preform whereby to blow the preform within the molds.

12. Apparatus according to claim 11 in which each mold comprises an inner half supported fixedly and a hinged half which can pivot about 90° about a hinge on the inner half.

13. Apparatus for blow molding tubular preforms, comprising, an endless chain mounted for continuous movement in a path lying in a single plane, through first, second, third and fourth stations, in succession, said chain comprising links articulated by respective ones of a plurality of tubular pivots each comprising a first blowing nozzle, means at said first station, rotating in synchronism with movement of said chain, for loading a tubular preform onto each respective nozzle moving in succession therepast, means at said second station for heating a plurality of loaded preforms, while moving with said chain, molding means at said third station and rotating in synchronism with movement of said chain, for receiving and blowing through each tubular pivot of said chain, in sequence, each successive one of said heated preforms, to shape the same, and means at said fourth station, rotating continuously in synchronism with movement of said chain, to remove each shaped form from its blowing nozzle.

14. The apparatus of claim 13, said molding means at said third station comprising a platform rotatable about a fixed axis normal to the plane of the path of movement of said chain, a plurality of molds fixed to said platform in circumferentially-spaced relation about said axis, each said mold comprising a first mold half fixed with said platform and a second mold half hinged to said first half on an axis parallel with said plane, and means responsive to rotation of said platform to pivot each said second half, in sequence, between a first open position and a second position closed onto its first half.

15. The apparatus of claim 14, a plurality of second blowing nozzles rotating as a unit with said platform and carried thereby, and means operated by and in response to rotation of said platform to move each said second blowing nozzle into fluid-tight communication with a respective one of said first blowing nozzles of said chain, while a respective pair of said first and second mold halves are in their said second position.

References Cited
UNITED STATES PATENTS

| | | | |
|---|---|---|---|
| 2,712,161 | 7/1955 | Moss | 264—305 X |
| 2,750,624 | 6/1956 | Coates et al. | |
| 2,978,745 | 4/1961 | Langecker | 264—99 |
| 3,204,018 | 8/1965 | Hagen | 264—99 |
| 3,079,637 | 3/1963 | Marzillier | 18—4 X |
| 3,149,373 | 9/1964 | Marzillier | 264—94 X |

ROBERT F. WHITE, *Primary Examiner.*

A. R. NOE, *Assistant Examiner.*

U.S. Cl. X.R.

18—4, 5; 65—110, 264; 264—297